United States Patent [19]

Obara

[11] Patent Number: 4,803,327
[45] Date of Patent: Feb. 7, 1989

[54] ELECTRICAL POWER FEEDER FOR A WIRE ELECTRODE TYPE ELECTRICAL DISCHARGE MACHINING APPARATUS

[75] Inventor: Haruki Obara, Sagamihara, Japan

[73] Assignee: Fanuc Ltd, Minamitsuru, Japan

[21] Appl. No.: 123,066

[22] PCT Filed: Mar. 3, 1987

[86] PCT No.: PCT/JP87/00131
§ 371 Date: Dec. 4, 1987
§ 102(e) Date: Dec. 4, 1987

[87] PCT Pub. No.: WO87/05242
PCT Pub. Date: Sep. 11, 1987

[30] Foreign Application Priority Data

Mar. 5, 1986 [JP] Japan ................................ 61-49270

[51] Int. Cl.⁴ ............................................. B23H 7/10
[52] U.S. Cl. ................................. 219/69 W; 439/217
[58] Field of Search ............... 219/69 W; 439/32, 33, 439/131, 132, 189, 217, 218; 204/206

[56] References Cited

U.S. PATENT DOCUMENTS

| | | | |
|---|---|---|---|
| 4,263,116 | 4/1981 | Inoue | 219/69 W |
| 4,559,433 | 12/1985 | Aramaki et al. | 219/69 W |
| 4,628,172 | 12/1986 | Inoue | 219/69 D |
| 4,652,717 | 3/1987 | Briffod et al. | 219/69 W |
| 4,733,038 | 3/1988 | Girardin | 219/69 W |

FOREIGN PATENT DOCUMENTS

| | | | |
|---|---|---|---|
| 56-52133 | 5/1981 | Japan . | |
| 58-51019 | 3/1983 | Japan | 219/69 W |
| 59-47123 | 3/1984 | Japan | 219/69 W |
| 182024 | 10/1984 | Japan . | |
| 141432 | 7/1985 | Japan | 219/69 W |
| 61-38819 | 2/1986 | Japan . | |

Primary Examiner—A. D. Pellinen
Assistant Examiner—Geoffrey S. Evans
Attorney, Agent, or Firm—Staas & Halsey

[57] ABSTRACT

An electric power feeder for a wire electrode type electrical discharge machining apparatus having a wire electrode includes a first power supply for rough electrical discharge machining and a second power supply for finish electrical discharge machining. In one embodiment, the second electric power supply is movably arranged in the direction crossing the wire electrode so that the wire electrode is selectively connected to the first electric power supply or to the second electric power supply by moving the second power supply, feeder for a wire electrode type electrical discharge machining equipment comprising a wire electrode guide. In a second embodiment, the first electric power supply and the second electric power supply are arranged leaving a small distance therebetween in which the wire electrode passes and a wire electrode shifter changes the direction of the wire electrode so that the wire electrode (1) is selectively connected to the first electric power supply or the second electric power supply.

6 Claims, 2 Drawing Sheets

ELECTRICAL POWER FEEDER FOR A WIRE ELECTRODE TYPE ELECTRICAL DISCHARGE MACHINING APPARATUS

BACKGROUND OF THE INVENTION

1. Field of the Invention

This invention relates to an improvement applicable to an electric power feeder for a wire electrode type electrical discharge machining apparatus. More specifically, this invention relates to an improvement applicable to an electric power feeder for a wire electrode type electrical discharge machining apparatus, such an improvement having been developed for the purpose of allowing arbitrary selection of any of a plurality of electrical power supply circuits, each having an impedance whose value is different those of the others. The plural electrical power supply circuits are installed to allow a single electrical discharge machining apparatus to realize optimum machining characteristics corresponding to any selected machining speed, required smoothness of the machined surface, etc.

2. Description of the Related Art

It is known that the machining speed decreases for a wire electrode type electrical discharge machining, whenever machining is performed with a more inductive discharge circuit or with a discharge circuit which has a larger value of inductance. Thus, a coaxial cable or the like, which has a relatively small value of inductance, is preferably employed for the discharge circuit of an electrical discharge machining apparatus which is employed for rough machining or preliminary machining. Incidentally, it is known that the smoothness of the machined surface is improved whenever the amount of energy to be applied for each discharge of an electrical discharge machining is smaller. Thus, a discharge circuit having a smaller value of capacitance is preferably employed for an electrical discharge machining apparatus which is employed for precise machining or finish machining.

Since coaxial cables and the like are inevitably involved with a considerable value of stray capacitance, employment of a coaxial cable is not preferable for finish machining performed with an electrical discharge machining apparatus. In other words, the above described two independent requirements are contradictory or antinomical from each other.

Due to the above limitation, a wire electrode type electrical discharge machining apparatus which is desirably employed both for rough or preliminary machining and for precise or finish machining is preferably equipped with "a rough-machining-circuit" having an electric power supply circuit of a coaxial cable or the like and with "a finish-machining-circuit" having an electric power supply circuit of an ordinary cable having a small value of capacitance. The circuits are selectively employed corresponding to the nature of the machining to be conducted.

In the prior art, however, no electric power feeder is available which readily allows selection of the above described two independent electric power supply circuits which are entirely different from each other in the polarity/value of impedance. For example, an electric power feeding having "a circuit-selective-means" consisting of an electromagnetic contactor could be supposed. However, such a feeder would naturally have several drawbacks. The first drawback is that an electromagnetic contactor has a large value of inductance, resultantly causing it to be unqualified for rough machining. The second drawback is that an electromagnetic contactor has an electromagnetic coil, resultantly reducing the reliability of the electrical power supply circuit which is employed for an electrical discharge machining apparatus which employs water as a machining liquid.

SUMMARY

An object of this invention is to provide an electric power feeder for a wire electrode type electrical discharge machining apparatus wherein, the electric power feeder is connected with at least two independent circuits, the impedance of each being different from each other, the at least two independent circuits being selectively employed for rough or preliminary machining, for precise or finishing machining, or for any other particular mode, for the ultimate purpose of realizing optimum machining characteristics for each of the rough or preliminary machining, for the precise or finish machining and for any other machining mode.

To achieve the above object, an electric power feeder for a wire electrode type electrical discharge machining apparatus in accordance with the first embodiment of this invention is provided comprising:

(a) a wire electrode guide 3;

(b) first electric power supply means 51 for supplying a rough machining power which is arranged along a wire electrode 1 for electrical discharge machining, the wire electrode 1 being guided by the wire electrode guide 3; and (c) second electric power supply means 52 for supplying a finish machining power which is movably arranged in a direction such that it crosses the path of the wire electrode 1 for electric discharge machining, the second electric power supply means 52 being arranged along the wire electrode 1 and guided by the wire electrode guide 3 for electric discharge machining, wherein the wire electrode 1 is allowed to be selectively contacted with either the first electric power supply means 51 or the second electric power supply means 52 by moving the second electrical power supply means 52.

The drive or the shifter 52b of the second electric power supply means 52, which is movable in a direction such that it crosses the path of the wire electrode 1, is selectable from a wide variety of drivers or shifters. Employable for this purpose are a group of shifters including a pneumatic or hydraulic cylinder type shifter, an electromagnetic or electric motor driven shifter, a bellows or rubber bag type shifter, etc.

To achieve the above object, an electric power feeder for a wire electrode type electrical discharge machining apparatus in accordance with a second embodiment of this invention is provided, comprising:

(a) a wire electrode guide 3;

(b) first electic power supply means 53 for supplying a first machining power;

(c) second electric power supply means 54 for supplying a second machining power, the first and second power supplies arranged face to face leaving a small distance therebetween in which a wire electrode 1 for electric discharge machining is allowed to pass, the wire electrode 1 being guided by the wire electrode guide 3; and (d) wire electrode shifting means 4 for regulating the direction in which the wire electrode 1 extends, wherein the wire electrode 1 is allowed to be selectively contacted with either the first electric power supply means 53 or the second electric power supply means 54 by shifting the wire electrode 1 with the shifting means 4.

The wire electrode shifting means 4 is selectable from a wide variety of shifters. Employable for this purpose any shifter from a group of shifters including a pneumatic or hydraulic cylinder type shifter, an electromagnetic or electric motor driven shifter, a bellows or rubber bag type shifter, etc.

Needless to emphasize, the first and second electric power supply means 51 and 52 of the first embodiment must be insulated from each other. This requirement is also are applicable to the first and second electric power supply means 53 and 54 of the second embodiment.

A more detailed description will be presented below for an electric power feeder for a wire electrode type electrical discharge machining apparatus of this invention, referring to the accompanying drawings wherein like reference numbers designate the same or similar parts throughout.

DETAILED DESCRIPTION OF THE PREFERRED EMBODIMENTS

First Embodiment

Figure 1:
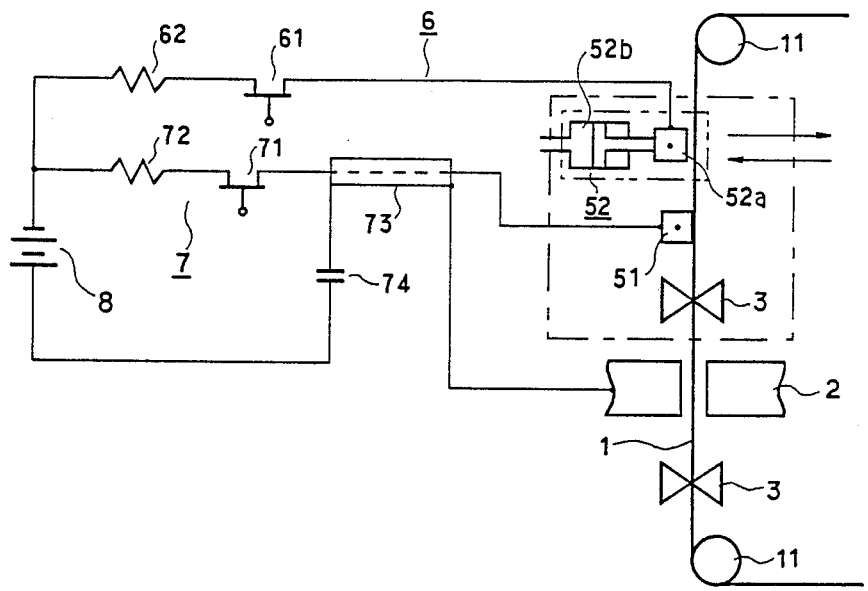
FIG. 1 is a schematic drawing of a wire electrode type electrical discharge machining apparatus including an electric power feeder for in accordance with a first embodiment of this invention.

Referring to FIG. 1, a wire electrode 1 is guided by upper and lower wire electrode guides 3, with tension being applied to the wire electrode 1 by a tension applying means (not shown). The wire electrode 1 penetrates a workpiece 2 and is further guided by a pair of guide rolls 11. A first electric power supply 51 is unmovable in this embodiment. A second electric power supply 52, which is a combination of a main body 52a and a drive or shifter 52b, is movable in this embodiment from side to side, as illustrated in the FIG. 1. The second electric power supply 52 is illustrated surrounded by a two-dotted chain line.

As was described above, a wide selection of shifters is available for the drive or the shifter 52b of the second electric power supply 52. In other words, any drive or shifter selected from the group including a pneumatic or hydraulic cylinder type shifter, an electromagnetic or electric motor driven shifter, a bellows or rubber bag type shifter etc. can be employed for this purpose. However, the last one (the bellows or rubber bag type shifter) is the most convenient from practical viewpoints.

An electric power feeder for a wire electrode type electrical discharge machining apparatus in accordance with the first embodiment of this invention is a combination of one of the wire electrode guides 3, the first electric power supply 51 and the second electric power supply 52, and is illustrated surrounded with a one-dotted chain line.

Each of the first electric power supply 51 and the second electric power supply 52 is connected with either an electric power supply circuit 6 or an electric power supply circuit 7. In this embodiment, the electric power supply circuit 6 includes an ordinary cable or the like having a small value of capacitance, and is employed for finish machining. The electric power supply circuit 7 includes a coaxial cable or the like having a small value of inductance and is employed for rough machining. Each of the electric power supply circuits 6 and 7 is a series circuit of a switching element 61 or 71 and a resistor 62 or 72, and both electric power supply circuits 6 and 7 are connected with one terminal of a DC power supply 8, of which the other terminal is connected with the workpiece 2 through a capacitor 73 and the external sheath of the coaxial cable 74.

The wire electrode type electrical discharge machining apparatus having the above described electric power feeder becomes a power supply circuit suitable for finish machining, whenever the wire electrode 1 is removed from the first electric power supply 51, which is connected with the electric power supply circuit 7 for rough machining, and contacted with the second electric power supply 52, which is connected with the electric power supply circuit 6 for finish machining. Such selective removal and/or contact is realized by employing the drive or shifter 52b to move the main body 52a of the second electric power supply 52 to the right in FIG. 1.

On the other hand, the wire electrode type electrical discharge machining apparatus having the above described electric power feeder becomes a power supply circuit suitable for rough machining whenever the wire electrode 1 is removed the second electric power supply 52, which is connected with the electric power supply circuit 6 for the finish machining, and contacted with the first electric power supply 51, which is connected with the electric power supply circuit 7 for rough machining. Such selective removal and/or contact is realized by employing the drive or shifter 52b to move the main body 52a of the second electric power supply 52 to the left in FIG. 1.

The aforementioned description has clarified that moving the second electric power supply 52 from side to side causes a slight change in the direction of the wire electrode 1, resultantly allowing the wire electrode 1 to selectively contact either the first or second electric power supply 51 or 52. This allows a wire electrode of a wire electrode type electrical discharge machining equipment apparatus having plural electric power supply circuits, each of which has an impedance which is different from each other, to be selectively connected with either "the finish-machining-circuit" 6 or the "the rough-machining-circuit" 7, corresponding to the machining requirement. This allows either finish machining or a rough machining to be performed and realizes the optimum machining characteristics both for rough machining and for the finish machining. Further, since the aforementioned structure can be readily employed in a wet environment, the reliability is also significantly improved for the electric power feeder in accordance with the first embodiment of this invention.

Figure 2:
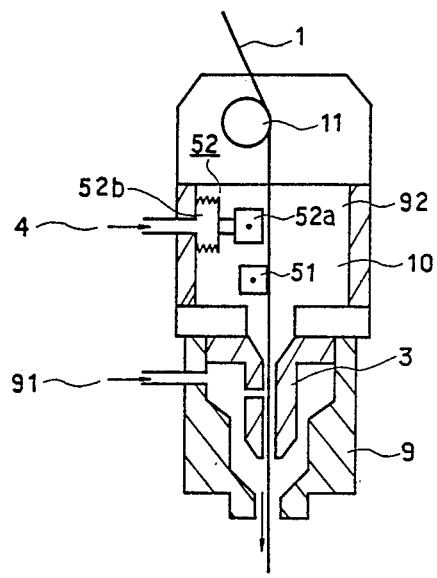
FIG. 2 is a cross-sectional view of the electric power feeder for the wire electrode type electrical discharge machining apparatus in accordance with the first embodiment of this invention illustrated in FIG. 1.

Referring to FIG. 2, a more detailed description will be presented below for the structure of the electric power feeder for a wire electrode type electrical discharge machining apparatus in accordance with the first embodiment of this invention.

Referring FIG. 2, the wire electrode 1 is guided by the wire electrode guide 3 and the guide roll 11, and the first electric power supply 51 and the second electric power supply 52 are arranged along the path of the wire electrode 1. The second electric power supply 52 consists of the main body 52a and the drive or shifter 52b. The main body 52a is moved from side to side in FIG. 2 by the drive or shifter 52b, such that the second electrical power supply 52 either does not contact the wire electrode 1 or contacts the wire electrode 1 and moves the wire electrode 1 so that it breaks contact with the first electric power supply 51.

The drive or shifter 52b illustrated in FIG. 2 is the bellows or rubber bag type shifter which is inflated by being supplied with the air and deflated by purging the air.

A nozzle 9 is arranged to surround the wire electrode guide 3, and a machining liquid which is supplied through a machining liquid supply tube 91 is gushed in the machining area. The first electric power supply 51 is arranged on an insulator plate 10 which is insulated from the second electric power supply means 52 (including the main body 52a and the drive 52b) which also is insulated from a machining liquid storage 92.

Second Embodiment

Figure 3:
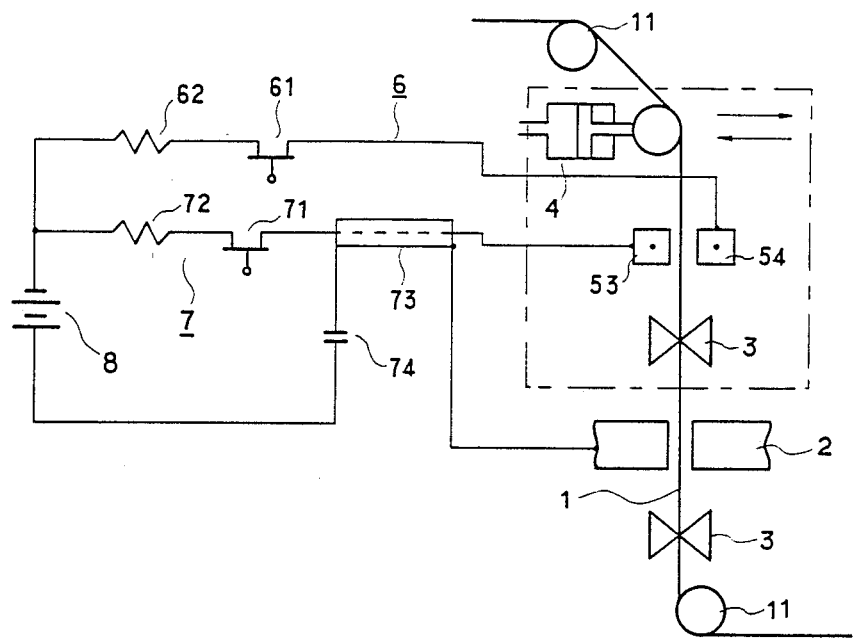
FIG. 3 is a schematic drawing of a wire electrode type electrical discharge machining apparatus including an electric power feeder in accordance with a second embodiment of this invention.

Referring to FIG. 3, a wire electrode 1 is guided by the upper and lower wire electrode guides 3, with tension being applied to the wire electrode 1 by a tension applying means (not shown). The wire electrode 1 penetrates a workpiece 2 and is further guided by a pair of guide rolls 11. A first electric power supply 53 and a second electric power supply 54 are arranged face to face leaving a small distance therebetween in which the wire electrode 1 for electric discharge machining is allowed to pass. A wire electrode shifting means 4 moves from side to side in the drawing, resultantly causing the wire electrode 1 to contact either the first electric power supply 53 or the second electric power supply 54.

Similar to the first embodiment, a wide variety of structures is available for the structure of the wire electrode shifting means 4. In other words, any drive or shifter selected from the group including a pneumatic or hydraulic cylinder type shifter, an electromagnetic or electric motor driven shifter, a bellows or rubber bag type shifter etc. can be employed for this purpose.

An electric power feeder for a wire electrode type electrical discharge machining apparatus in accordance with the second embodiment of this invention is one of the combination of a wire electrode guides 3, the first electric power supply 53 and the second electric power supply 54, and is illustrated surrounded with a single-dot chain line.

Each of the first electric power supply 53 and the second electric power supply 54 is connected with either an electric power supply circuit 6 or an electric power supply circuit 7. In this embodiment, the electric power supply circuit 6 includes an ordinary cable or the like having a small value of capacitance and is employed for finish machining. The electric power supply circuit 7 includes a coaxial cable or the like having a small value of inductance and is employed for a rough machining. Each of the electric power supply circuits 6 and 7 is a series circuit of a switching element 61 or 71 and a resistor 62 or 72, and both electric power supply circuits 6 and 7 are connected with one terminal of a DC power supply 8, of which the other terminal is connected with workpiece 2 through a capacitor 74 and the external sheath of the coaxial cable 73.

The wire electrode type electrical discharge machining apparatus having the above described electric power feeder becomes a power supply circuit which can be selectively set for either a finish machining or for a rough machining, by operating the wire electrode shifting means 4 to contact the wire electrode 1 to either the first electric power supply 53 or the second electric power supply 54.

In a similar manner to that described for the first embodiment, the aforemtnioned description has clarified that since moving the path of the wire electrode 1 from side to side causes a selective contact of the wire electrode 1 with either the first electric power supply 53 or the second electric power supply 54, thereby allowing a wire electrode type electrical discharge machining equipment provided with plural electric power supply circuits, each of which having an impedance which is different from each other, to be selectively connected with either "the finish-machining-circuit" 6 or "the rough-machining-circuit" 7, corresponding to the machining requirement. This allows either finish machining or rough machining to be performed and realizes the optimum machining characteristics both for rough machining and finish machining. Further, since the aforementioned structure can be readily employed in a wet environment, the reliability is also significantly improved for the electric power feeder in accordance with the second embodiment of this invention.

Figure 4:
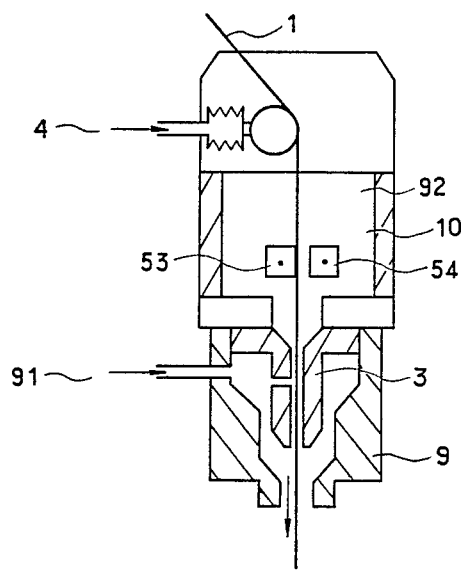
FIG. 4 is a cross-sectional view of the electric power feeder for the wire electrode type electrical discharge machining apparatus in accordance with the second embodiment of this invention illustrated in FIG. 3.

Referring to FIG. 4, a more detailed description will be presented below for the structure of the electric power feeder for a wire electrode type electrical discharge machining apparatus in accordance with the second embodiment of this invention.

Referring to FIG. 4, the wire electrode 1 is guided by the wire electrode guide 3 and the guide roll 11, the first electric power supply 53 and the second electric power supply 54 are arranged face to face, leaving a small distance therebetween through which the wire electrode 1 for electric discharge machining is allowed to pass. A wire electrode shifting means 4 moves from side to side in the drawing, resultantly contacting the wire electrode 1 with either with the first electric power supply 53 or with the second electric power supply 54.

In this embodiment, a wire electrode shifting means 4 which is provided with a bellows or rubber bag, which is inflated by being supplied with the air and deflated by purging the air, is illustrated as an example.

A nozzle 9 is arranged to surround the wire electrode guide 3, and a machining liquid which is supplied through a machining liquid supply tube 91 is gushed in the machining area. The first electric power supply 53 is arranged on an insulator plate 10 which is insulated from the second electric power supply means 54 and which also is insulated from a machining liquid storage 92.

The foregoing description has clarified that this invention has successfully provided an electric power feeder for a wire electrode type electrical discharge machining apparatus, the electric power feeder being connected with at least two independent circuits, the impedance of each being different from one another, the at least two independent circuits being selectively employed for rough or preliminary machining, for a precise or finish machining, or for any other machining mode, for the ultimate purpose of realizing optimum machining characteristics for each of rough or preliminary machining, for precise or finish machining and for any other machining mode.

I claim:

1. An electric power feeder for a wire electrode type electrical discharge machining apparatus having a wire electrode, said apparatus comprising:
   a wire electrode guide for guiding a wire electrode;
   first electric power supply means arranged along the wire electrode for supplying a first machining power to the wire electrode; and
   second electric power supply means, movably arranged to selectively connect with the wire electrode and disconnect the wire electrode from said first power supply means, for supplying a second machining power to the wire electrode so that the wire electrode is selectively contacted with either said first electric power supply means or said second electric power supply means.

2. An electric power feeder for a wire electrode type electrical discharge machining apparatus according to claim 1, wherein said first and second electric power supply means are electrically insulated from each other.

3. An electric power feeder for a wire electrode type electrical discharge machining apparatus according to claim 1, wherein said first electric power supply means provides a rough machining power, and said second electric power supply means provides a finish machining power.

4. An electric power feeder for a wire electrode type electrical discharge machining apparatus having a wire electrode, comprising:
   a wire electrode guide for guiding a wire electrode;
   first electric power supply means for supplying a first machining power to the wire electrode;
   second electric power supply means for supplying a second machining power to the wire electrode, said first and second electric power supply means being arranged face to face so that a small distance remains therebetween in which the wire electrode passes; and
   wire electrode shifting means for shifting the wire electrode to selectively contact the wire electrode with either said first electric power supply means or said second electric power supply means.

5. An electric power feeder for a wire electrode type electrical discharge machining apparatus according to claim 4, wherein one of said electric power supply means supplies a rough machining power and the other of said electric power supply means supplies a finish machining power.

6. An electric power feeder for a wire electrode type electrical discharge machining apparatus according to claim 4, wherein said first and second electric power supply means are electrically insulated from each other.

* * * * *

UNITED STATES PATENT AND TRADEMARK OFFICE
CERTIFICATE OF CORRECTION

PATENT NO. : 4,803,327

DATED : February 7, 1989

INVENTOR(S) : Haruki Obara

It is certified that error appears in the above-identified patent and that said Letters Patent is hereby corrected as shown below:

Col. 1, line 17, "those of" should be --from those of--;

Col. 2, line 9, "SUMMARY" should be --SUMMARY OF THE INVENTION--;

Col. 3, line 15, delete "are";

Col. 3, line 27, delete "for";

Col. 4, line 21, "73" should be --74--;

Col. 4, line 22, "74." should be --73.--;

Col. 4, line 40, after "removed" insert --from--;

Col. 5, line 6, after "Referring" insert --to--;

Col. 5, line 55, "one of" should be --a--;

Col. 5, line 56, delete "the" (first occurrence);

Col. 5, line 56, "a wire" should be --one of the wire--;

UNITED STATES PATENT AND TRADEMARK OFFICE
CERTIFICATE OF CORRECTION

PATENT NO. : 4,803,327

DATED : February 7, 1989

INVENTOR(S) : Haruki Obara

It is certified that error appears in the above-identified patent and that said Letters Patent is hereby corrected as shown below:

Column 6, line 49, delete "with", first occurrence.

Signed and Sealed this

Eighteenth Day of July, 1989

*Attest:*

DONALD J. QUIGG

*Attesting Officer*  *Commissioner of Patents and Trademarks*